Aug. 8, 1939.  G. A. WELLS  2,168,835
VARIABLE-SPEED PULLEY FOR V-BELT DRIVES
Filed Sept. 19, 1938   2 Sheets-Sheet 1
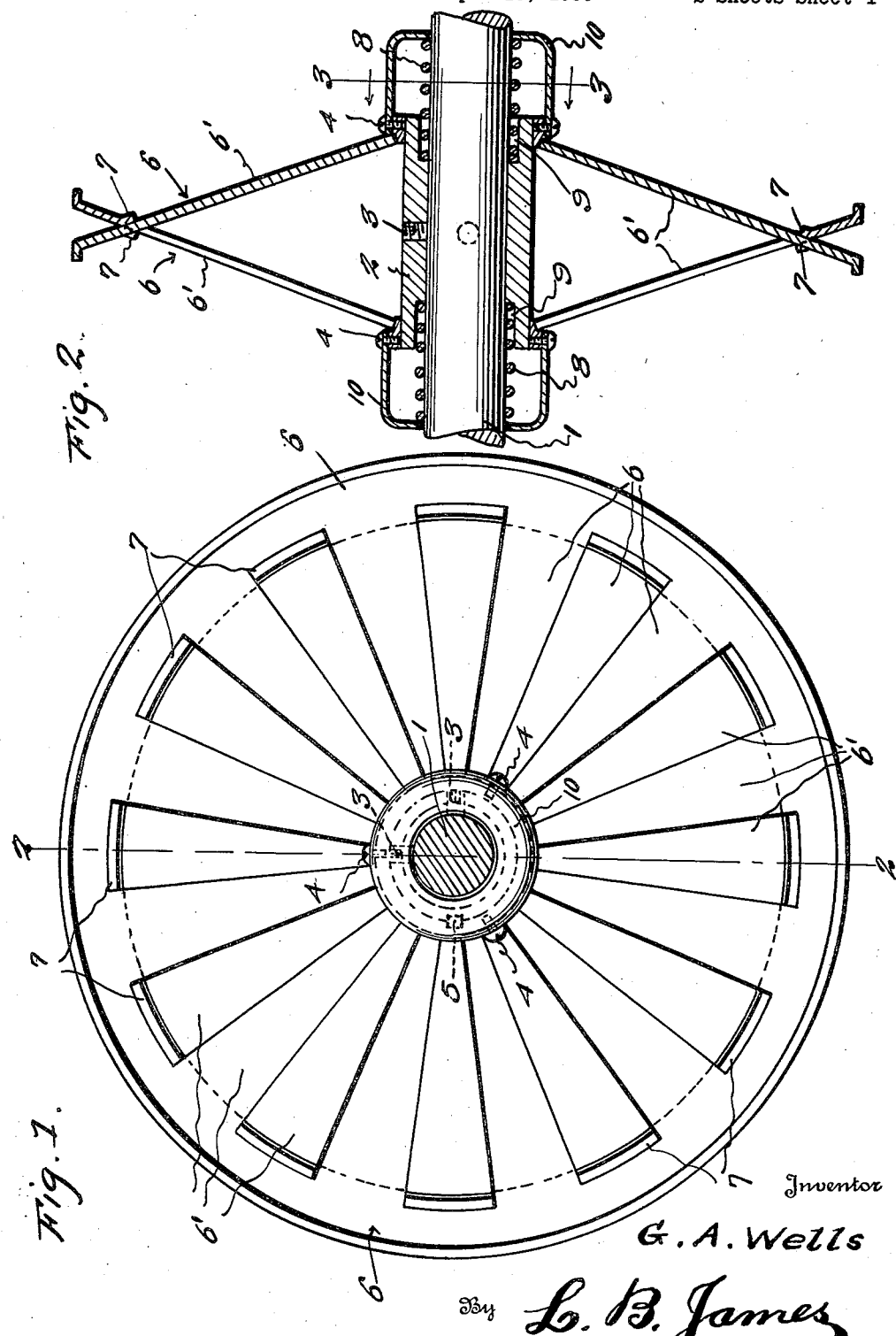

Aug. 8, 1939.                 G. A. WELLS                2,168,835
              VARIABLE-SPEED PULLEY FOR V-BELT DRIVES
                    Filed Sept. 19, 1938         2 Sheets-Sheet 2
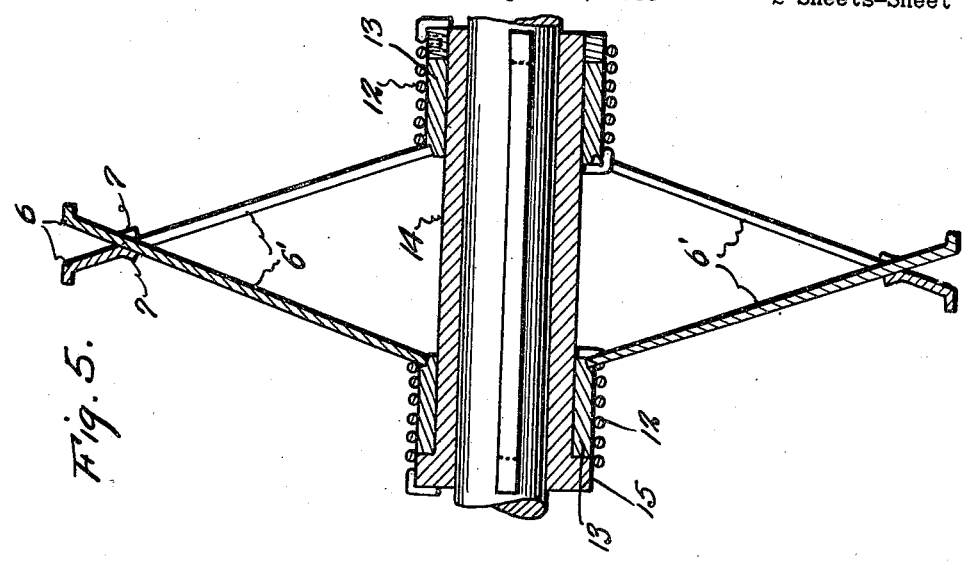
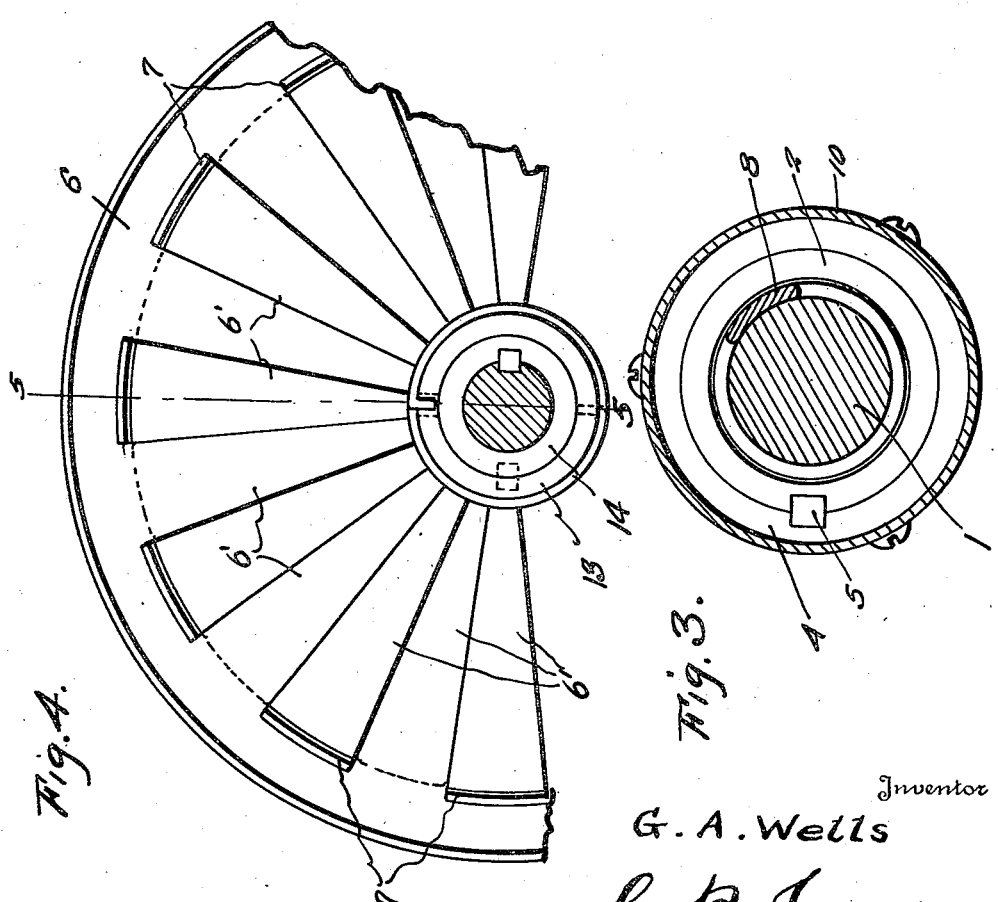
Inventor
G. A. Wells
By L. B. James
Attorney Patented Aug. 8, 1939

2,168,835

UNITED STATES PATENT OFFICE 2,168,835

VARIABLE-SPEED PULLEY FOR V-BELT DRIVES

Gilbert A. Wells, New London, Wis.

Application September 19, 1938, Serial No. 230,694

3 Claims. (Cl. 74—230.17)

This invention relates to a variable speed sheave or pulley for V shaped belts, the general object of the invention being to provide a pair of disk-like members having portions adjacent their peripheries interlacing for rocking movement, with spring means at their inner peripheries tending to move the inner edges toward each other. Thus the spring means tend to hold the belt engaging portion of the sheave or pulley at maximum diameter but when the belt is tightened to spread apart the outer edges, the inner edges move away from each other, thus decreasing the diameter of the sheave.

The invention also consists in certain other features of construction, combination and arrangement of the several parts, to be hereinafter fully described, illustrated in the accompanying drawings and specifically pointed out in the appended claims.

In describing the invention in detail reference will be had to the accompanying drawings wherein like characters denote like or corresponding parts throughout the several views, and in which:

Fig. 1 is an elevation of one form of the invention.

Fig. 2 is a section on line 2—2 of Fig. 1.

Fig. 3 is a section on line 3—3 of Fig. 2.

Fig. 4 is a fragmentary elevation of another form of the invention.

Fig. 5 is a section on line 5—5 of Fig. 4.

Referring to Figs. 1, 2 and 3, the numeral 1 indicates a shaft, to which the hub 2 is secured in any suitable manner, such as by means of the screws 3. A pair of rings 4 are slidably but non-rotatably arranged on the hub by one or more keys and ways, shown generally at 5. The inner periphery or edge of a disk 6 is secured to each ring and these disks are cut to provide the spokes 6', the outer portions of which interlace, as shown at 7, so that the disks are connected together for rocking movement at said points 7, which will permit the outer edges or peripheries to move towards or away from each other. These outer portions form an annular recess of V shape in cross section for receiving a V shaped belt. A spring 8 has one end fastened in a recess 9 in each end of the hub and its other end is fastened to a cap 10, fastened to each ring 4. The caps enclose the ends of the hub and the shaft passes through the caps. These springs tend to hold the parts with the rings 4 inwardly of the hub ends and the sheave or pulley at maximum diameter but when the belt is tightened, the portions which form the V shaped space for the belt are forced apart so that the inner edges of the disks and the rings 4 are forced away from each other and thus the diameter of the sheave or pulley is decreased. As soon as the belt is loosened the springs return the rings to positions where the diameter of the sheave is increased. Thus the device provides a variable speed pulley or sheave by the automatic change of diameter of the pulley.

In the modification shown in Figs. 4 and 5, expansion springs 12 are used and these engage the rings 13 keyed to the hub 14, said hub having flanges 15 at its ends for limiting outward movement of the rings and the outer ends of the springs are secured to these flanges as shown. In other respects this form of the invention is similar to that first described.

By having both halves of the sheave or pulley adjustable, the center line of the belt will always remain at the middle of the assembly, so that it will be unnecessary to move the motor or other parts on an angle as would be the case if one side was fixed.

It is thought from the foregoing description that the advantages and novel features of the invention will be readily apparent.

It is to be understood that changes may be made in the construction, combination and arrangement of the several parts, provided such changes fall within the scope of the appended claims.

What I claim and desire to protect by Letters Patent is:

1. In a pulley of the class described, a sleeve provided with means to secure it fixedly on a shaft, a pair of hub members slidably mounted on said sleeve, a pair of caps each adapted to fixedly fit on a respective hub member to project away from the sleeve in alinement therewith, each hub member being provided with an end having an opening adapted to receive the shaft on which the sleeve is mounted, a pair of converging disk members each consisting of a series of radial spokes radiating from a hub and a rim, the spokes of each member passing through the spaces between the spokes of the other member, and coiled compression springs each bearing at one end against a cup end and at its other end against the adjacent sleeve end.

2. In a pulley of the class described, a sleeve provided with means to secure it fixedly on a shaft, a pair of hub members slidably mounted on said sleeve, a pair of caps each adapted to fixedly fit on a respective hub member to project away from the sleeve in alinement therewith, each hub member being provided with an end having an opening adapted to receive the shaft on which the sleeve is mounted, a pair of converging disk members each consisting of a series of radial spokes radiating from a hub and a rim, the spokes of each member passing through the spaces between the spokes of the other member, and coiled compression springs each bearing at one end against a cup end and at its other end against the adjacent sleeve end, said sleeve having internal rabbets at its ends forming seats for the sleeve engaging ends of the springs.

3. In a pulley of the class described, a sleeve provided with means to secure it fixedly on a shaft, a pair of hub members slidably mounted on the sleeve, a pair of converging disk members each consisting of a series of radial spokes radiating from a hub member and a rim, the spokes of each member passing through the spaces between the spokes of the other disk member, and a pair of coiled tension springs each surrounding a hub member and having its outer end bent to engage against the outer end face of the sleeve and its inner end bent to engage the inner end face of the respective hub member.

GILBERT A. WELLS.